United States Patent
Mayis et al.

(10) Patent No.: US 10,481,782 B2
(45) Date of Patent: Nov. 19, 2019

(54) WEB-BASED VISUALIZATION SYSTEM OF BUILDING OR HOME AUTOMATION

(71) Applicant: ABB AG, Mannheim (DE)

(72) Inventors: Francois Mayis, Colomiers (FR); Eric Ferro, Castelmeurou (FR); Herve Jallabert, Fonsorbes (FR)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 15/790,093

(22) Filed: Oct. 23, 2017

(65) Prior Publication Data

US 2018/0046364 A1 Feb. 15, 2018

Related U.S. Application Data

(63) Continuation of application No. PCT/EP2016/054669, filed on Mar. 4, 2016.

(30) Foreign Application Priority Data

Apr. 24, 2015 (EP) ..................................... 15001224
Aug. 21, 2015 (EP) ..................................... 15002486

(51) Int. Cl.
*G06F 16/957* (2019.01)
*G09G 5/02* (2006.01)
*G06F 3/0484* (2013.01)
*H04L 12/28* (2006.01)
*H04L 12/24* (2006.01)
*H04L 29/08* (2006.01)
*G09G 5/14* (2006.01)

(52) U.S. Cl.
CPC ...... *G06F 3/04847* (2013.01); *G06F 16/9577* (2019.01); *G09G 5/026* (2013.01); *G09G 5/14* (2013.01); *H04L 12/2818* (2013.01); *H04L 12/2825* (2013.01); *H04L 41/22* (2013.01); *H04L 67/025* (2013.01); *G09G 2340/0407* (2013.01); *G09G 2370/022* (2013.01); *H04L 12/2803* (2013.01); *H04L 2012/2849* (2013.01)

(58) Field of Classification Search
None
See application file for complete search history.

(56) References Cited

U.S. PATENT DOCUMENTS

| | | | | |
|---|---|---|---|---|
| 6,157,943 A | * | 12/2000 | Meyer | ........... H04L 29/06 709/203 |
| 7,487,447 B1 | | 2/2009 | Jerger | |
| 2011/0202847 A1 | * | 8/2011 | Dimitrov | ........... G06F 3/0481 715/738 |
| 2012/0304113 A1 | * | 11/2012 | Patten | ........... G06F 3/04883 715/800 |

* cited by examiner

*Primary Examiner* — Yanna Wu
(74) *Attorney, Agent, or Firm* — Leydig, Voit & Mayer, Ltd.

(57) ABSTRACT

In an embodiment, the present invention provides a web-based visualization system of building or home automation, including: a web server, which is connected with at least two client devices and in the client devices are integrated at least one client display and a rendering engine. The rendering engine contains a resize engine, which is uploaded to the client devices when a client requests at least one dedicated web-side from the web server. The rendering engine includes a zoom in/out function of a displayed page on the client display.

7 Claims, 1 Drawing Sheet

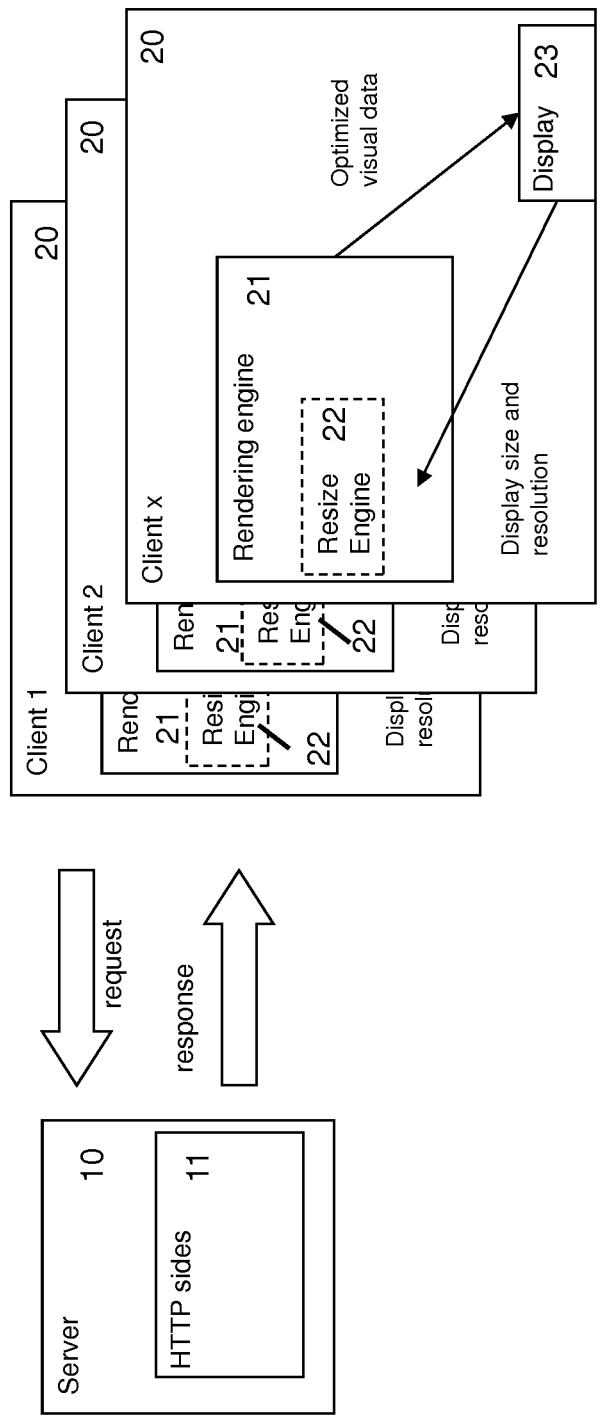

WEB-BASED VISUALIZATION SYSTEM OF BUILDING OR HOME AUTOMATION

CROSS-REFERENCE TO PRIOR APPLICATION

This application is a continuation of International Patent Application No. PCT/EP2016/054669, filed on Mar. 4, 2016, which claims priority to European Patent Application No. 15001224.3, filed on Apr. 24, 2015, and European Patent Application No. 15002486.7, filed on Aug. 21, 2015. The entire disclosures of these applications are hereby incorporated by reference herein.

FIELD

The invention relates to a web-based visualization system of building or home automation.

BACKGROUND

Visualization systems for building or home automation are used to control and monitor a building or a part of a building, e.g. in functional buildings, hotels, office buildings, hospitals, apartment buildings etc. and display information of the entire building, automation and to control heating, cooling systems, ventilation and air conditioning, systems, lighting, sun-shading systems, fire protection and/or security systems via the building visualization.

Some of the visualization systems use standalone devices running operation system kernel and user interface on the same device. These devices are equipped with a fixed resolution display. The visualization of building or home information is statically designed for this fixed resolution and does not allow resizing to different screen sizes. All views are predefined and composed of controls, text and symbols which perfectly fit to the known screen resolution.

Furthermore, a client/server based architecture is used. In this case the server hosts the system kernel to which one or more remote clients are connected, in order to receive the data for displaying the user interface. Also these known implementations support only clients, which are well known by the system kernel with their fixed screen resolution. Upon request of a known client, the server sends out the predefined screen for the fixed resolution of the client.

Current implementations of building automation visualization systems use browser technologies like HTML, Java Script and style sheets. These technologies give more independence for displaying the user interface on client devices. This technology concept relies on client/server architecture as well. However the client must not be known by the server with its screen resolution. On request, the server only sends a description of the user interface to the client. It is up to the client to read the description and to generate the user interface upon the internal information.

The disadvantages of these implementations concern to the display size and/or resolution of the client, which must be set during commissioning time already. If the client is changed at runtime and the client provides a different display resolution, the user interface will not be displayed correctly. In this case a new configuration and setup is required.

The HTML based implementations are more flexible regarding different clients. But in this case it is not necessary to parameterize the display size of the client beforehand.

However, for generating the visualization of the user interface the client fully relies on a standard software component, called rendering engine, which the operating system of the client provides. The known rendering engines cannot ensure a fully compatible visualization of the user interface on every client display size and resolution. For example the content of a HTTP side is shown too small on high resolution displays.

The rendering engine is provided in order marked up content, such as HTML, XML, image files, etc. and formatting information, such as CSS, XSL, etc., and displays the formatted content on the screen. The content area of a window is displayed on a monitor or a printer.

The rendering engine can integrate e.g. in a web browser, an e-mail, an e-book reader, an on-line help system or another application of the client device, which require the displaying and editing of web content.

SUMMARY

In an embodiment, the present invention provides a web-based visualization system of building or home automation, comprising: a web server, which is connected with at least two client devices and in the client devices are integrated at least one client display and a rendering engine, wherein the rendering engine contains a resize engine, which is uploaded to the client devices when a client requests at least one dedicated web-side from the web server, the rendering engine including a zoom in/out function of a displayed page on the client display.

BRIEF DESCRIPTION OF THE DRAWINGS

The present invention will be described in even greater detail below based on the exemplary FIGURES. The invention is not limited to the exemplary embodiments. Other features and advantages of various embodiments of the present invention will become apparent by reading the following detailed description with reference to the attached drawings which illustrate the following:

FIG. 1 shows an exemplary embodiment of the innovative web-based visualization system of building or home automation.

DETAILED DESCRIPTION

According to an aspect of the present invention, there is provided a web-based visualization system of building or home automation comprising a web server, which is connected with at least two client devices. In the client devices a rendering engine is integrated.

The invention enhances the rendering engine with a resize engine. The resize engine is uploaded to the client device in case that the client requests at least one dedicated web-side (1 1), e.g. HTTP-sides, from the web-server.

Afterwards the resize engine requests display information like resolution and/or size from an underlying operating system with at least one client display. All further data of the HTTP side are passed to the resize engine.

The resize engine is provided in order to pre-process the data with regard to the current display resolution and/or size of the client's display.

The rendering engine generates a final view for the display by using the pre-processed data of the resize engine.

Advantageous, by the resize engine is also used for zoom in/out function of a displayed page. It is capable to resize text and graphics without stair-step effects. This additional processing in the resize engine also allows zooming into a very detailed view as well as zooming out to a broad overview.

Additionally the new visualization system is fully independent of any display size or resolution of the client devices, like computers, mobile phones, tablets, tablet PC's, ultra books, notebooks, etc., but also every new client devices in future.

According to an advantageous aspect of the inventive system it helps to support a huge portfolio of different client devices without the need of configuring each client during the commissioning phase. There is no re-commissioning necessary in case that a client is replaced at runtime.

The new system provides a client independent web-based building or home visualization system.

In the exemplary embodiment of the invention, the innovative web-based visualization system of building or home automation comprises a web-server 10, which is connected with several client devices 20. The client devices 20 use web browsers to display HTTP-sides 1 1, which are delivered by the web-server 10.

Each client device 20 contains a client display 23 and a software component, which is a rendering engine 21. The rendering engine 21 in order marked up content, formatting and displays the formatted content on the display of the client device 20.

According to the invention, it is envisaged that the rendering engine 21 contains a resize engine 22, which is uploaded to the client devices 20 in case that the client makes requests at least one dedicated HTTP-side 1 1 from the web-server 10 and zooms in/out function of a displayed page on the client display 23.

The resize engine 22 calculates location and size of the rectangular components of displayed pages and manages a set of components organized in a hierarchical tree structure of components and sub components. Each sub-component can be itself a container of sub-components.

The sub-components are member of a parent container of initial size with cx=width and cy=height, to each sub-component is initialized:
The initial coordinates x1, y1, x2, y2 (relative to parent container)
The delta of the coordinates dx1, dy1, dx2, dy2 applied to subcomponents when parent container size is changed.

When container size is changed, the resize engine 22 calculates sub-components size as follows:

$$x1=x1+dx1*dcx$$

$$y1=y1+dy1*dcy$$

$$x2=x2+dx2*dcx$$

$$y2=y2+dy2*dcy$$

Considering that dx1, dy1, dx2, dy2 are between 0 and 1.
dx1=0 means left anchoring.
dx2=1 means right anchoring.
dy1=0 means top anchoring.
dy2=1 means bottom anchoring.

An automatic algorithm of the resize engine 22 corresponds to a component resize proportional to their original coordinates (x1, y1, x2, y2) and so the size.

The new component location/size is obtains by:

$$dx2=x2/cx$$

$$dy2=y2/cy$$

Where cx; cy are width and height of parent container.

The automatic algorithm thus furnished ratio that can be applied to any component without any deep knowledge of anchoring algorithm.

It is fully possible to mix inside the resize engine 22 components using the automatic anchoring algorithm or a fully customized anchoring algorithm.

This keepRatio mode allows positioning a component by keeping its original aspect (ratio width/height).

In this case the previous calculation gives a first rectangle. In this rectangle, the component is positioned by keeping the width/height ratio.

Depending on cases, transparent space can be added on side of the component to keep the ratio.

The following two new factors are needed for the described calculation to position the component with a horizontal factor and a vertical factor:
1. For the horizontal factor: 0 means the component is aligned left, 1 means aligned right, 0.5 means horizontally centered
2. For the vertical factor: 0 means the component is aligned top, 1 means aligned bottom, 0.5 means vertically centered.

The algorithm of the resize engine 22 allows too, to easily anchor the two components together in such a way that contiguous border are moving together during a resize operation. This is obtained by applying the same factor to the borders.

For instance if right border of Component 1 must follow left border of Component 2 then Component 1 .dx2 must be equal to Component 2.dx1

This engine 21 allows creating easily views that are like spreadsheet. For instance, a tab of 5 columns is done by applying following factors to the borders of each column (0, 0.2, 0.4, 0.6, 0.8, 1).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE LIST 10 web server
11 web-side, HTTP side
20 client device 21 rendering engine
22 resize engine
23 display unit, client display

What is claimed is:

1. A web-based visualization system of building or home automation for controlling and monitoring at least a part of a building and displaying information of the part of the building, to control at least one system of the part of the building, including one of a heating, cooling, ventilation, air conditioning, lighting, sun-shading, fire protection, and security system, the web-based visualization system comprising:
   at least two client devices, each of which includes at least one client display and a rendering engine; and
   a web server, which is connected with the at least two client devices and the at least one system of the part of the building,
   wherein each rendering engine contains a resize engine, which is uploaded to a respective client device when a client requests at least one dedicated web-side from the web server, the resize engine including a zoom in/out function of a displayed page on the at least one client display of the respective client device,
   wherein the web-based visualization system is independent of a display size or resolution of the at least one client display of the respective client device, and
   wherein the resize engine is configured to request display information from an underlying operating system of the respective client device.

2. The system according to claim 1, wherein each of the at least two client devices comprises a computer, a mobile phone, a tablet, a tablet PC, an ultra-book, a notebook, or any web-based client device with a display.

3. The system according to claim 1, wherein the at least one dedicated web-side comprises HTTP-sides.

4. The system according to claim 1, wherein the display information comprises resolution and/or size.

5. The system according to claim 3, wherein data of the HTTP-sides are passed to the resize engine.

6. The system according to claim 5, wherein the resize engine is configured to pre-process the data with regard to a current display resolution and/or size of the at least one client display of the respective client device.

7. The system according to claim 6, wherein the rendering engine is configured to generate a final view for the at least one client display of the respective client device using the pre-processed data of the resize engine.

* * * * *